United States Patent
Heiligenstein

(10) Patent No.: US 9,574,918 B2
(45) Date of Patent: Feb. 21, 2017

(54) POWERING WIRELESS COMPONENTS IN A HEAT TRACE SYSTEM

(71) Applicant: Chromalox, Inc., Pittsburgh, PA (US)

(72) Inventor: Adam Heiligenstein, Gibsonia, PA (US)

(73) Assignee: CHROMALOX, INC., Pittsburgh, PA (US)

(*) Notice: Subject to any disclaimer, the term of this patent is extended or adjusted under 35 U.S.C. 154(b) by 141 days.

(21) Appl. No.: 14/618,217

(22) Filed: Feb. 10, 2015

(65) Prior Publication Data

US 2016/0230372 A1 Aug. 11, 2016

(51) Int. Cl.
| | | |
|---|---|---|
| H05B 1/02 | (2006.01) | |
| G01F 1/704 | (2006.01) | |
| F16L 53/00 | (2006.01) | |
| E03B 7/12 | (2006.01) | |
| E03B 11/00 | (2006.01) | |

(52) U.S. Cl.
CPC .............. *G01F 1/7044* (2013.01); *E03B 7/12* (2013.01); *E03B 11/00* (2013.01); *F16L 53/001* (2013.01); *F16L 53/008* (2013.01); *H05B 1/0244* (2013.01); *H05B 1/0297* (2013.01)

(58) Field of Classification Search
CPC .......... E03B 7/12; E03B 11/00; H05B 1/0244; H05B 1/0297; F16L 53/008; F16L 53/001; G01F 1/7044; H04W 84/18
USPC . 219/494, 497, 213, 535, 483, 486; 392/468
See application file for complete search history.

(56) References Cited

U.S. PATENT DOCUMENTS

| | | | |
|---|---|---|---|
| 4,751,495 A | 6/1988 | Whitman | |
| 5,475,384 A | 12/1995 | Manenti et al. | |
| 5,900,179 A | 5/1999 | Bilenko et al. | |
| 2009/0260438 A1* | 10/2009 | Hedtke | G01H 11/08 73/579 |
| 2011/0133655 A1* | 6/2011 | Recker | H02J 9/02 315/159 |
| 2001/0163082 | 7/2011 | Mullen | |

(Continued)

FOREIGN PATENT DOCUMENTS

DE 102013206247 A1 10/2014

OTHER PUBLICATIONS

U.S. Appl. No. 61/865,851, filed Aug. 14, 2013 (17 pages).

(Continued)

*Primary Examiner* — Mark Paschall
(74) *Attorney, Agent, or Firm* — K&L Gates LLP

(57) ABSTRACT

Heat trace system for heating vessels of a piping system comprises a main control system, a plurality of heat trace elements, and a plurality of wireless modules. Each heat trace element is adjacent to one of the vessels of the piping system and connected to an electrical power source of the main control system 16. Each of the wireless modules: (a) is connected to and powered by an associated heat trace element; (b) comprises an energy storage device connected to the associated heat trace element for storing energy from the associated heat trace element to power the wireless module; and (c) comprises an RF module for communicating wirelessly with the main control system via a wireless communication network. The stored energy in the energy storage device can be used to power components of the wireless module, even when no current is flowing in the heat trace element to which the wireless module is connected.

18 Claims, 6 Drawing Sheets

(56) References Cited

U.S. PATENT DOCUMENTS

| | | | |
|---|---|---|---|
| 2011/0163082 A1* | 7/2011 | Mullen | G05B 23/0275 |
| | | | 219/494 |
| 2011/0320048 A1* | 12/2011 | Kim | H04Q 9/00 |
| | | | 700/282 |
| 2012/0054397 A1* | 3/2012 | Melvin, Jr. | H02J 13/0075 |
| | | | 710/300 |
| 2013/0024029 A1* | 1/2013 | Tran | A61B 5/1113 |
| | | | 700/278 |
| 2013/0154389 A1* | 6/2013 | Kurs | B60L 3/0069 |
| | | | 307/104 |
| 2014/0152468 A1* | 6/2014 | Obenchain | A61M 16/20 |
| | | | 340/870.09 |
| 2014/0305930 A1* | 10/2014 | Heizer | G08C 17/02 |
| | | | 219/539 |
| 2016/0049819 A1* | 2/2016 | Butler | H02J 7/0054 |
| | | | 320/105 |

OTHER PUBLICATIONS

International Patent Application No. PCT/US2014/049591, filed Aug. 4, 2014 (21 pages).
European Search Report for European Application No. 16152211 dated May 6, 2016 (6 pages).

\* cited by examiner

POWERING WIRELESS COMPONENTS IN A HEAT TRACE SYSTEM

CROSS-REFERENCE TO RELATED APPLICATIONS

The present application is related in subject matter and ownership to PCT application number PCT/US14/49591, filed Aug. 4, 2014, entitled "Powering Sensors in a Heat Trace System," which claims priority to U.S. provisional application Ser. No. 61/865,851, filed Aug. 14, 2013, entitled "Powering Sensors in a Heat Trace System," both of which are incorporated herein by reference in their entirety.

BACKGROUND

Heat trace systems are commonly used in industrial and commercial settings to maintain or raise the temperature of pipes or tanks in a piping system through the use of electrical heating elements or heat traces that are in physical contact with the pipe or tank, as the case may be. Most heat trace systems are controlled by a main control system and also include many types of sensors and control devices throughout the piping system. The main control system receives data about conditions of the heat trace system that are detected by the various sensors and control aspects of the heating system by controlling the various control devices.

While wireless sensors and control devices have gained acceptance in many industries, they have not gained much acceptance in heat trace systems because there is no suitable way to power the wireless modules. Batteries are not preferred in heat trace systems because a battery failure could result in catastrophic failure (such as when a frozen pipe bursts when a wireless sensor with a spent battery is unable to detect the decreasing temperature of the pipe). Also, running power cables to the wireless devices is expensive and defeats the purpose of having a wireless device.

SUMMARY

In one general aspect, the present invention is directed to a heat trace system used for heating vessels (e.g., pipes or tanks) in a piping system or installation. In particular, the heat trace system can comprise a number of wireless modules distributed throughout the heat trace system that are in wireless communication with a main control system for the heat trace system via a wireless communication network. Each wireless module is connected to and powered by the voltage from an associated heat trace element. In that connection, the wireless modules may comprise an energy storage device that stores charge from the voltage difference across the buss wires of the heat trace element. The charge stored in the energy storage devices (e.g., supercapacitors) is used to electrically power the other components of the respective wireless modules. Further, the wireless modules can transmit the charge level of their energy storage device to the main control system via the wireless communication network. The main control can then compare the received charge levels to desired charge levels and, if below a threshold level, adjust (increase) the voltage level of the appropriate heat trace element to thereby allow the energy storage device of wireless module connected to that heat trace element to increase its charge level to at least the threshold level. As such, the main control system can momentarily power up the wireless modules at times when their energy storage devices are running low. Powering the wireless modules with the heat trace cables in such a manner obviates the need for batteries at the wireless modules, and obviates the need to use separate power lines (separate from the heat trace cables) to power the wireless modules.

These and other benefits of the present invention will be apparent from the description that follows.

FIGURES

Various embodiments of the present invention are described herein by way of example in conjunction with the following figures, wherein.

Figure 7:
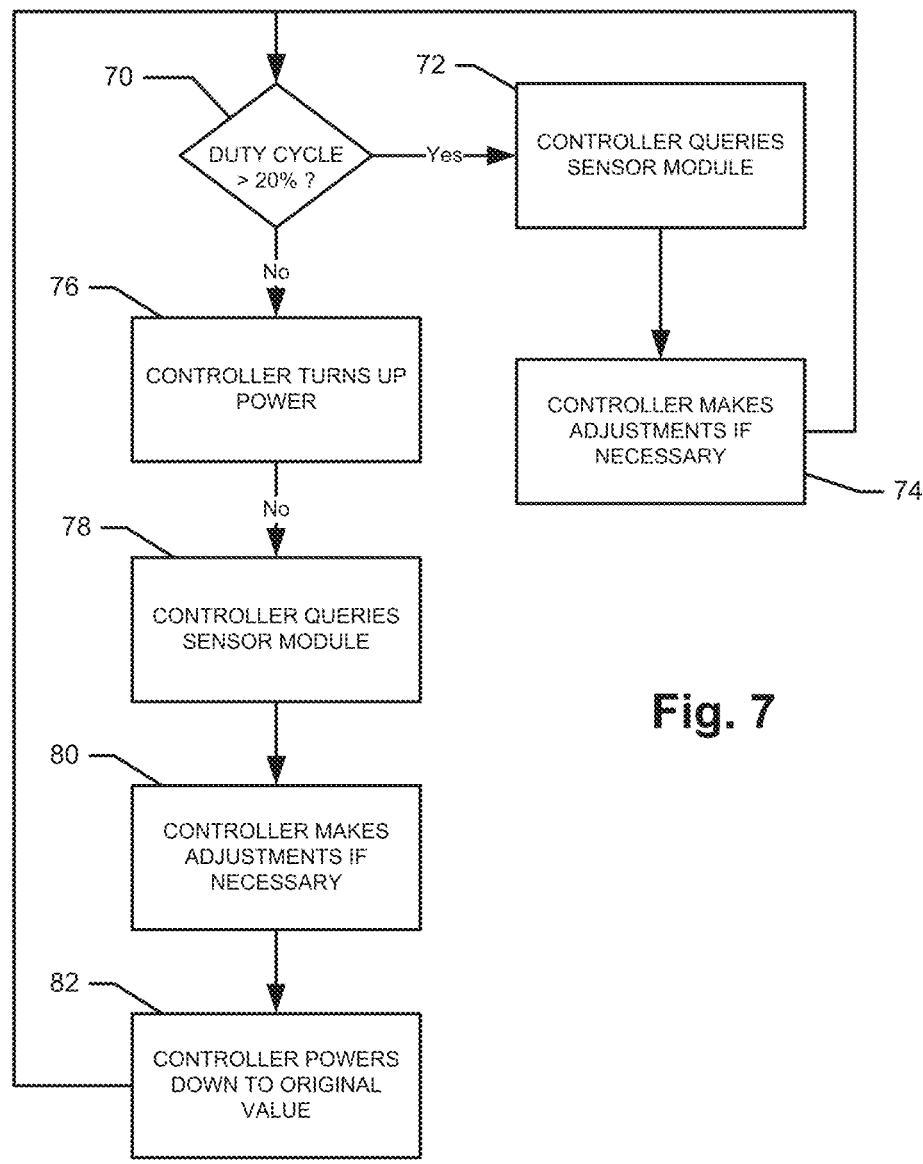
Figure 8:
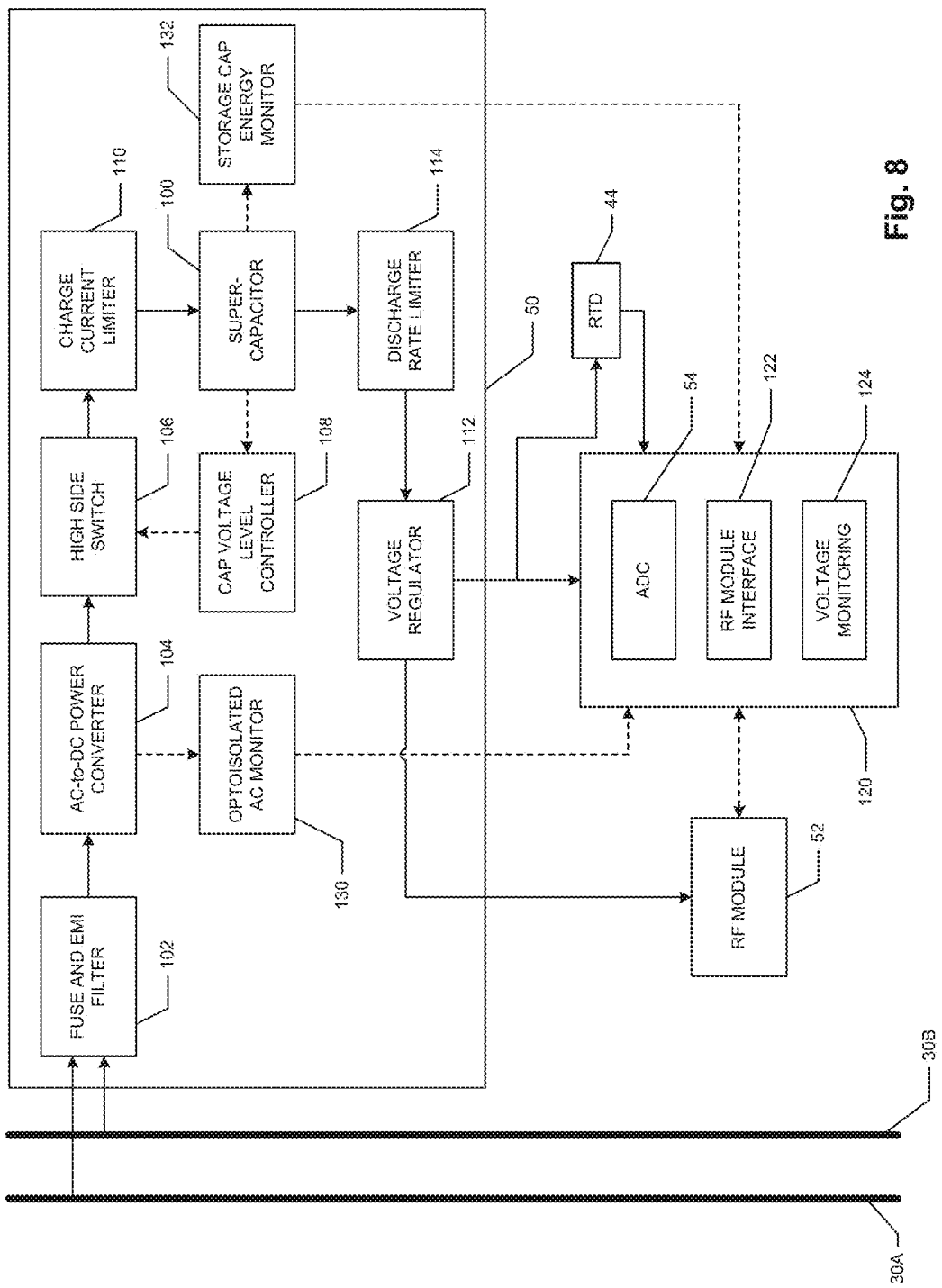
Figure 9:
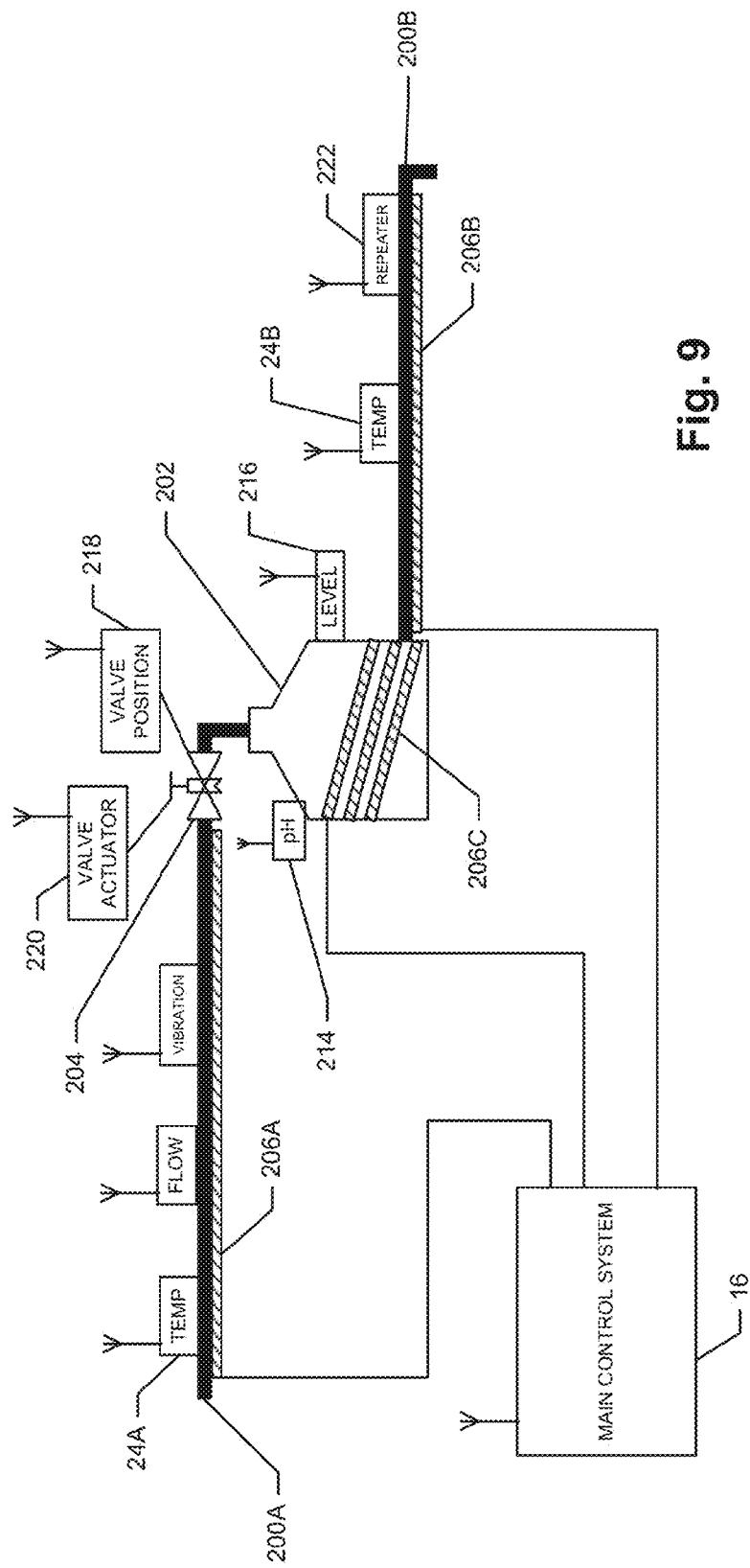

FIG. 7 diagrams a process flow of the controller according to various embodiments of the present invention;

FIG. 8 is a block diagram of a sensor module according to various embodiments of the present invention; and FIG. 9 is a diagram of a piping system with a heat trace system and various wireless modules according to various embodiments of the present invention.

DESCRIPTION

Figure 1:
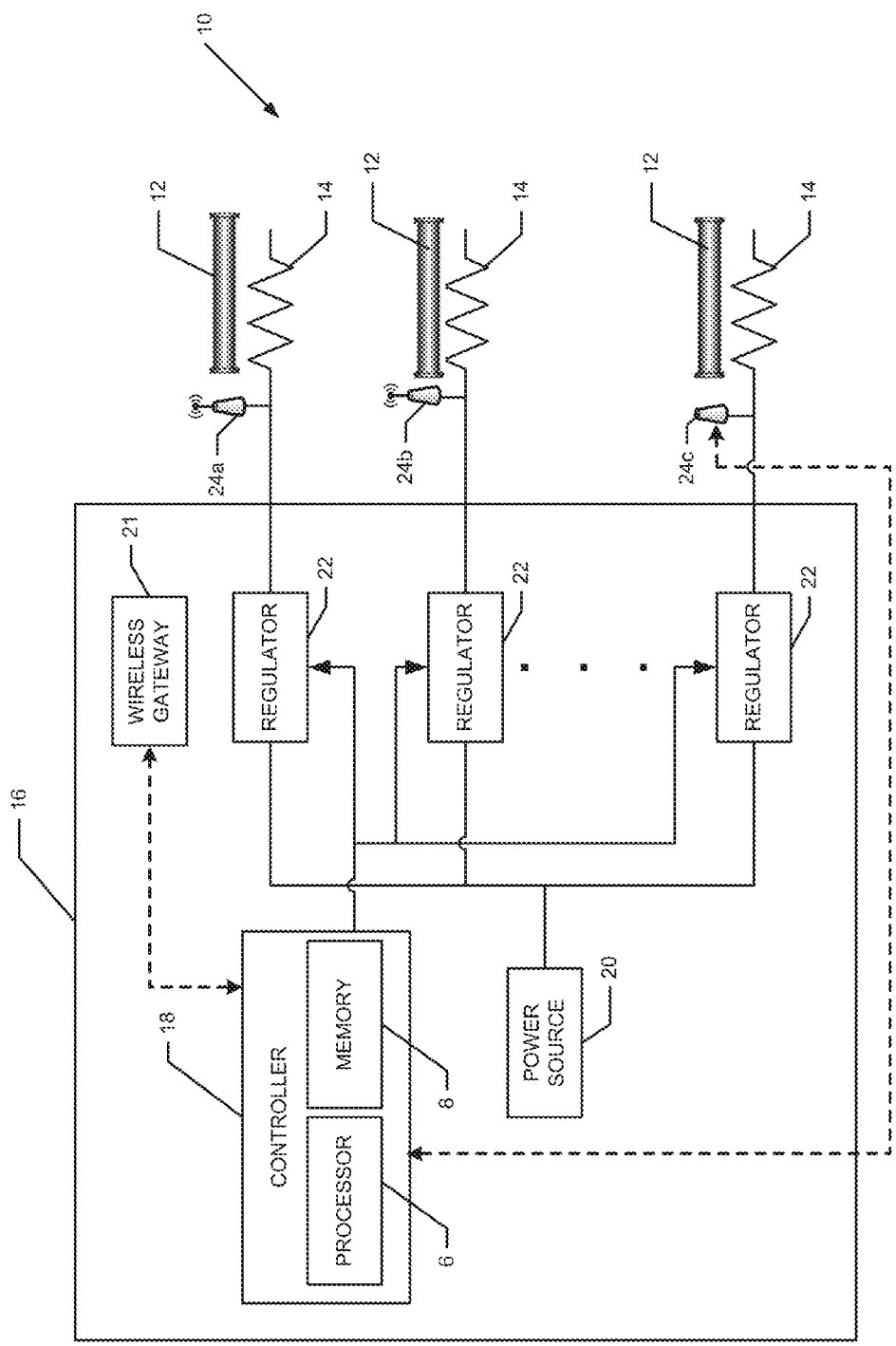
FIG. 1 is a simplified block diagram of a heat trace system according to various embodiments of the present invention.

The present invention is directed generally to systems and methods for powering wireless components (or modules) in a heat trace system. Heat traces are used to heat pipes or tanks (collectively referred to herein sometimes as "vessels") in a piping system that carries fluids. FIG. 1 is a simplified block diagram of a heat trace system 10 according to various embodiments of the present invention. For the sake of simplicity, FIG. 1 only shows the heat trace system being used for three separate sections of pipe 12 in the heating system, although it should also be recognized that heat traces could be used for other types of liquid-carrying or—containing vessels in the system, such as tanks, etc.

In the example of FIG. 1, each illustrated heat trace 14 is proximate to its associated pipe section 12 for heating its associated pipe section 12. Of course, in an industrial setting, there are likely to be many more sections of pipe that need heated. More details regarding the heat traces 14, which are shown schematically in FIG. 1 as resistors, are provided below in connection with FIGS. 2 through 5. In particular, as described below, the heat traces 14 are preferably in contact with the pipe sections 12, and covered with insulation. The heat traces 14 are preferably electrical heating elements that heat the pipe sections 12 when conducting electrical current. Heat generated by the heat traces 14 is for maintaining the temperature of the pipe 12. Trace heating may be used to protect pipes from freezing, to maintain a constant flow temperature in hot water systems, or to maintain process temperatures for piping that must transport substances that solidify at ambient temperatures.

As shown in FIG. 1, the heat trace system 10 may include a central or distributed microprocessor-based main control system 16. The main control system 16 may comprise, among other things, a controller and a power source 20. The controller 18 may be implemented as a smart, microprocessor-based, computer device (or a network of such devices) that, through programming, controls the operation of the heating system, including controlling the current applied to the heat traces 14 (to thereby control the heating therefrom) and controlling other components of the heating system as described further below. In that connection, the controller 18 may comprise at least one microprocessor 6 and at least one semiconductor memory unit 8. The memory unit 8 stores instructions, e.g., software or firmware, that is executed by the processor 6. Among other things, the controller 18 controls individually the current supplied to the various heat traces 14 through individual loops—one loop for each heat trace 14—to thereby control the heating of the pipes 12 in the piping system. The power source 20 may include AC mains power, e.g., 100-480 VAC three phase. The power source 20 is connected to the heat traces 14 via regulators 22 on each loop. The regulators 22 control the voltage from the power source 20 applied to each loop. In various embodiments, the regulators 22 comprise power control devices, such as silicon-controlled rectifiers (SCRs), solid state relays (SSRs), traces, or contactors. The controller 18 controls the duty cycles of the power control devices to thereby control the voltage applied to its associated heat trace 14.

The heat trace system 10 also includes a number of wireless components (or "modules") throughout. The components can include wireless sensors such as, for example, temperature sensors, flow measurement sensors, tank level measurement sensors, tank level switches, pressure sensors, vibration sensors, valve position sensors, open/close contact sensors, pH monitors, density monitors, etc. The wireless components can also include non-sensor wireless devices for the heating system, such as valve actuators, wireless repeaters, etc. Initially, various aspects for powering wireless components of a heat trace system according to the present invention will be described in the context of wireless temperature sensor modules, although it should be recognized that the powering techniques of the present invention could be used for such other types of wireless components in the heat trace system.

As shown in FIG. 1, wireless temperature sensor modules 24a-c may be distributed throughout the piping system and include a temperature sensor for sensing the temperature of various pipe sections 12 in the piping system. The sensor modules 24a-c preferably include a resistance temperature detector (RTD). The sensed temperature is reported back by the sensor modules 24a-c to the controller 18 of the main control system 16. The controller 18 is programmed to compare the sensed temperatures to desired, set point temperatures (which may be, and usually are, different for different pipe sections 12), and control the regulators 22 based on the comparisons to achieve desired output voltages. Chromalox Inc.'s intelliTRACE® ITLS panel is an example of a suitable main control system 16. It may include (in addition to the processor 6 and semiconductor memory 8) a touch-screen user interface that allows a user to easily program the main control system 16 to the desired heat levels for each heat trace 14 being controlled by the main control system 16.

In FIG. 1, two of the sensor modules 24a-b are shown as wireless sensors that communicate wirelessly with the main control system 16 via, for example, a self-organizing, self-healing wireless mesh communication network. The wireless mesh communication network could be based on the IEEE 802.11 standard, the IEEE 802.15.4 standard, or the ISA-100.11a standard, for example. The control system 16 may include a wireless gateway 21 to receive the communications from the wireless sensor modules 24a-b in such an embodiment. The wireless gateway may be, for example, a WirelessHART Gateway from Pepperl+Fuchs. In other embodiments, some or all of the sensor modules 24 may have a wired data connection to the main control system 16, such as sensor module 24c illustrated in FIG. 1. The wired connection may be, for example, an Ethernet connection or twisted pair cables An important aspect of the present invention, however, is that the sensor modules 24a-c are powered by the heat traces themselves, thereby obviating the need for batteries or separate power lines for the sensor modules 24a-c. This aspect is described in more detail below.

Figure 5:
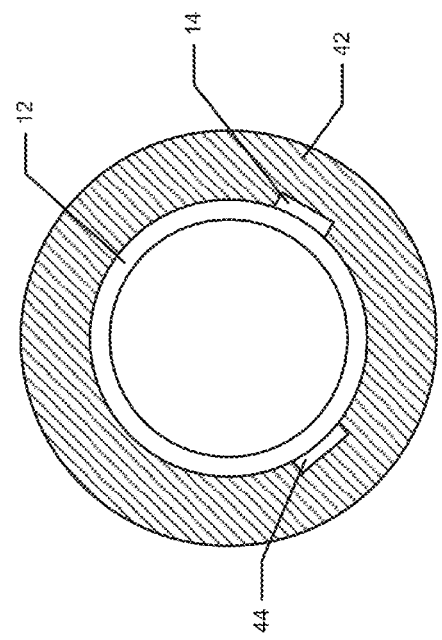
FIG. 5 is a cross-sectional view of a pipe section with a heat trace according to various embodiments of the present invention.
Figure 4:
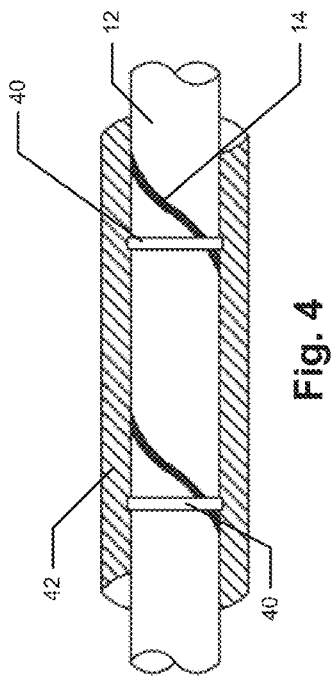
FIGS. 3 and 4 are side views of a pipe section with a heat trace according to various embodiments of the present invention.
Figure 2:
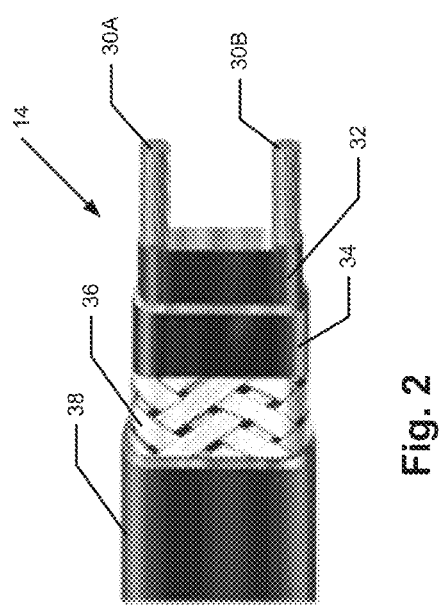
FIG. 2 illustrates aspects of a heat trace cable according to various embodiments of the present invention.
Figure 3:
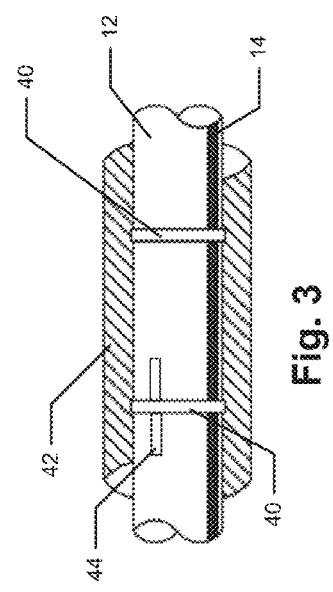

FIG. 2 is a diagram of a heat trace 14 that shows, in a cut-away view, its various layers according to various embodiments of the present invention. The heat trace 14 includes two buss wires 30A, B surrounded by a conductive matrix 32 (which is preferable polymeric). The conductive matrix 32 in turn may be surrounded a jacket 34, which may be surrounded by a metallic (e.g., tinned copper) braid 36 and an overcoat over braid 38 (preferably Teflon). The buss wires 30A, 30B carry electrical current from the power source 20, and the heat from the heat trace 14 heats the pipe 12 that it contacts to offset any losses in the pipe temperature. FIGS. 3-5 show that the heat trace 14 is preferably placed in contact with the outside of the pipe section 14. FIG. 3 shows an embodiment where the heat trace 14 runs straight along the pipe 14 and FIG. 4 shows an embodiment where the heat trace 14 is spirally wound around the pipe 12. The heat trace 14 may be held in place against the pipe 14 by a fastener 40, such as fiberglass tape or banding. Further, the heat trace 14 and pipe 12 are preferably surrounded by thermal insulation 42. FIG. 5 illustrates an exemplary cross-section view of the pipe 12. This figure shows that both the heat trace 14 and the temperature sensor 44 (e.g., RTD) of the sensor module 24 are located on the outside of the pipe 12. Preferably, the heat trace 14 and RTD 44 are at the lower portion of the pipe 12. In other applications, multiple heat traces 14 could be used for one pipe 12, in which case both heat traces 14 are preferably toward the bottom (e.g., at 4 and 8 o'clock positions), and the RTD 44 is toward the top of the pipe 12 (e.g., at the 2 o'clock position). FIG. 3 shows an embodiment where a RTD 44 is banded to the pipe 12 toward the top of the pipe 12.

Figure 6:
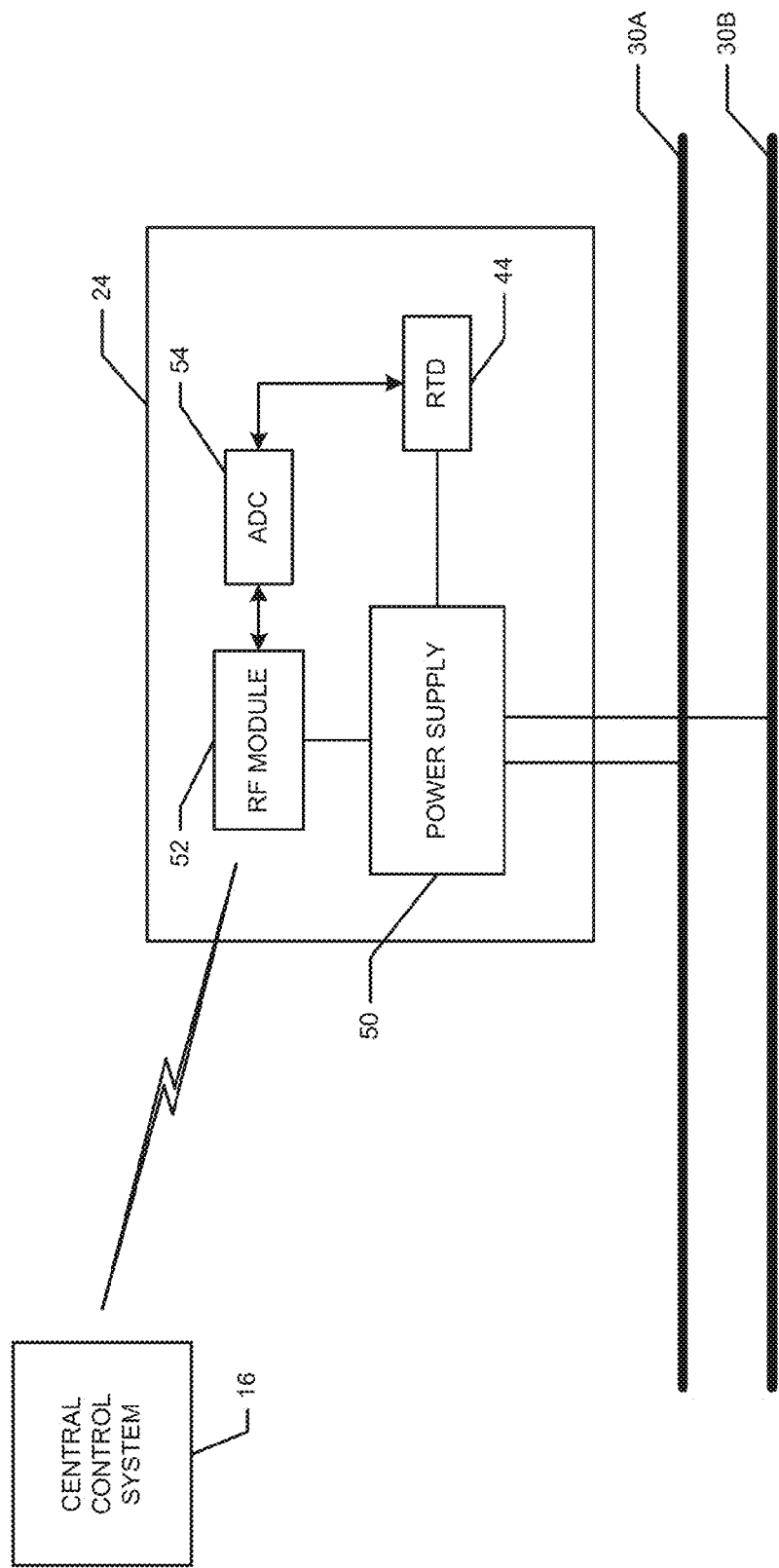
FIG. 6 is a block diagram of a sensor module according to various embodiments of the present invention.

As mentioned above, the sensor modules 24 are powered with electrical current in the heat traces 14. FIG. 6 is a simplified block diagram of a wireless sensor module 24 according to various embodiments of the present invention. As shown in FIG. 6, the wireless sensor module 24 may be powered electrically by the voltage difference across the buss wires 30A-B of the heat trace 14 (e.g., a 120V or 240V difference, based on the power source 20). As such, the sensor module 24 may be spliced to the heat trace 14 at a desired location along the heat trace 14. The sensor module 24, as shown in FIG. 6, may include a power supply 50 for converting the voltage from the buss wires 30A,B to desired voltage levels for powering the temperature sensor (RTD) 44 and an a RF communication module 52. The sensor module 24 may also include a microcontroller as described further below in connection with FIG. 8.

The RTD 44 senses the temperature at a localized point of the pipe (see FIGS. 3-5). The sensed temperature is sent, via an analog-to-digital converter (ADC) 54, to the RF communication module 52, which transmits the temperature data wirelessly to the main control system 16 via the wireless communication network. The RF communication module 52 manages the RF communications between the sensor module 24 and the main control system 16, and may be implemented with, for example, an application specific integrated circuit (ASIC). In other embodiments, some or all of the sensor modules 24 have a wired data connection to the main control system 16, such as via Ethernet cables (not shown). By powering the sensor module 24 with the heat trace 14, there is no need for batteries to power the sensor modules 24 and it obviates the need for separate power lines (separate from the heat traces 14) for supplying power to the sensor modules 24 (which would defeat the purpose of the wireless sensors). One problematic issue, however, with powering the sensor modules 24 with the heat traces 14 is that at times one or more heat traces 14 in the installation may carry no or insufficient current to power the sensor modules 24 (for example, if there associated tank or pipe does not currently require heating). In typical installations, the main control system 16 queries the various sensor modules 24 for their temperature reading, and based on that reading, controls the heat trace voltage and hence temperature. The main control system 16 can also logically compare readings from multiple sensors 24 on one line by using Boolean logic to decide whether to turn the heat traces 14 on the line on or off.

In order to overcome this problem, in various embodiments the power supply 50 of the sensor module 24 comprises an energy storage device, such as a supercapacitor (sometimes referred to as an "ultracapacitor"), for storing energy from the voltage difference across the buss wires of the heat trace 14 (when there is a voltage difference). That stored energy may be used to power the various components of the sensor module 24 even when there is no current in the heat trace 14. The sensor modules 24 can periodically report the charge level of the energy storage device back to the controller 18 so that the controller 18 can momentarily supply current to the heat trace 14 to thereby recharge the energy storage device of the power supply 50 to a sufficient charge level (e.g., above some pre-established threshold charge level).

FIG. 8 is a block diagram of a sensor module 24 according to an embodiment that uses a supercapacitor 100 as the energy storage device. The supercapacitor 100 may have a relatively large capacitance, such as 25 F with a full charge capacity/rating of 2.5 VDC, for example. In FIG. 8, power flow is indicated by solid lines (with arrows) and sensing or control lines between components are indicated by dashed lines (with arrows). As shown in FIG. 8, the power supply 50 may comprise a fuse and EMI filter 102 connected to the buss wires 30 A/B of the heat trace 14. An isolated AC-DC power converter converts the AC voltage from the heat trace 14 (after EMI filtering) to DC. A high-side switch 106 may be controlled by a capacitor voltage level controller 108 to conduct charging current to the supercapacitor 100 when the voltage across the capacitor is less than its maximum voltage rating (e.g., 2.5 V). Further, a charge current limiter 110 may limit the charge current supplied to the supercapacitor 100, such as to 100 mA, for example. In various embodiments, the high-side switch 106 and the charge current limiter 110 may be combined in a single suitable power management switch. The capacitor voltage level controller 108 may be implemented as a CMOS op amp connected as a comparator, for example, whose output disables the high-side switch 106 above the maximum voltage (e.g., 2.5 VDC) and enables (turns on) the high-side switch 106 at a lower voltage (e.g., 2.4 VDC).

Discharge current from the supercapacitor 100 is supplied to a voltage regulator 112 via a discharge rate limiter 114, which limits the discharge of the supercapacitor 100 to, for example, 10 to 20 mA. The voltage regulator 112 may provide a regulated output voltage (e.g., 3.3 Vout) to the RF module 52 (if there is one), a microcontroller 120, and the sensor (e.g., RTD) 44 (or the sensor 44 could be powered indirectly by the microcontroller 120). The microcontroller 120 may comprise, in various embodiments, the ADC 54 (see FIG. 6), an interface 122 for communicating with the RF module 52, and a voltage monitor module 124 for monitoring operation of the power supply 50. For example, as shown in FIG. 8, the power supply may comprise an optoisolated AC monitor 130 that allows the microcontroller 120 (via the voltage monitor module 124) to monitor whether there is AC voltage from the heat trace 14. Also, the power supply 50 may comprise a monitor 132 that monitors the voltage across the supercapacitor 100. Based on input from the monitor 132, the microcontroller 120 (via the voltage monitor module 124) can estimate the energy remaining in the supercapacitor 100 and predict how much operating time remains on the supercapacitor 100. The microcontroller 120 can transmit periodically (e.g., every minute) data about the status of the supercapacitor 100 to the controller 18 (e.g., charge time remaining, present charge level, etc.) so that the controller 18 can determine whether to pulse—and for how long to pulse—the associated heat trace 14 with voltage so that the energy storage device can store more energy. The energy storage data reports sent by the sensor module 24 may be with the same periodicity as the sensed temperature reports; that is, the reports could include both the sensed temperature and the storage charge level of the energy storage device. In various embodiments, the controller 18 can dynamically scale the frequency of the reports to optimize energy consumption.

In various embodiments, a 100 mA charge rate would take 250 seconds to charge a 25 F supercapacitor from 0 VDC to 1 VDC, and a charge from 1 VDC to 2.5 VDC would require an additional 375 seconds. A full discharge cycle of the supercapacitor 100 from 2.5 VDC to 1 VDC would allow approximately 1300 minutes of operation for the sensor module 24, assuming 0.050 J per report from the sensor module 24 to the main control system 16 with a report every minute.

Such momentary increases in power will not ordinarily have other deleterious effects on the system as the rate of change of the temperature of the material in an insulated pipe is relatively slow and it is not required for the main control system 16 to continuously know the temperature of the pipe. Further, since the heat traces only provide thermal maintenance (e.g., offset heat losses) and do not heat the material in the pipe, the system thermal dynamics are slow. Therefore, momentary increases in power will not significantly affect the material in the pipe 12.

FIG. 7 illustrates a process that the controller 18 may execute when communicating with one of the sensor modules 24 in another embodiment of the present invention. This embodiment may be used where the sensor module 24 does not include an energy storage device and the controller 18 needs to power up the heat traces to power up their associated sensor module. First, at step 70, the controller 18 checks the voltage on the loop of the sensor module 24. This may be done by checking the duty cycle of the regulator 22 for the loop. If the duty cycle is above some threshold where there is sufficient power to keep the sensor module 24 on (e.g., 20% as shown in the example of FIG. 7), at step 72 the controller 18 can query the sensor module 24 for its temperature reading and, at step 74, control the regulator 22 for the loop based on the temperature data received from the sensor module (e.g., turn up or down the duty of the SCRs (or other power control devices) of the regulator 22 depending on whether the temperature is too low or too high compared to a specified set point). The appropriate threshold for step 70 of course will depend on the power requirements for the sensor module 24 and the available power from the power source 20. From there the process can loop back to step 70 for the next time the controller 18 needs to query the sensor module 24.

On the other hand, if at step 70 the duty cycle is below the threshold, there is presumptively insufficient power for the sensor module 24. Therefore, at step 76, the controller 18 turns up the power for the loop (e.g., increases the duty cycle of the SCRs) for a brief period of time to a level that is sufficient to power on the sensor module 24. Once powered on, at step 78 the controller 18 queries the sensor module 24 for its current temperature status and, at step 80, controls the regulator 22 for the loop based on the temperature data received from the sensor module 24. Then at step 82 it can return the power level of the loop to its original level (e.g., the level it was at before it was raised at step 76) and return back to step 70 again. The length of time for steps 76 to 82 in FIG. 7 should be as brief as practical, yet long enough to power up the sensor module 24, obtain and report back the temperature data. For a wireless installation, depending on the number of sensor modules 24 and the geographic size of the layout, it may take several minutes for the mesh network to reestablish itself so that the temperature data can be reported back to the controller 18. The main control system 16 may have the capacity to control a finite number of heat trace loops, such as up to thirty six. If a piping installation requires additional heat trace loops, additional main control systems 16 may be used. Also, the components of a single main control system 16 may be embodied in a single control unit or panel, or the various components may be distributed across multiple, discrete, distributed control units or panels.

In various embodiments, the modules 24 may also be used to verify whether there is a break or otherwise diminished voltage connection between a heat trace 14 and its associated regulator 22, such as because of a break or loose connection in the heat trace wiring. In such an embodiment, a sensor module 24 may include a voltage sensor for sensing the voltage fed into its energy storage device 100 from the heat trace 14. The sensor module 24 can report this voltage back to the controller 18 so that the controller 18 can compare that voltage to the expected voltage from the heat trace's associated regulator 22. If the difference exceeds a threshold, the controller 18 determines that there is a compromised electrical connection to the heat trace 14 and reports an alarm.

As mentioned above, the techniques described herein for powering wireless components in a heat trace system could be used for other types of wireless components beside temperature sensors. In that connection, FIG. 9 is a diagram of a piping system with various types of wireless components that may be powered by the voltage across the heat trace elements according to the techniques described herein. The illustrative, simplified piping shown in the example of FIG. 9 includes two fluid carrying pipes 200A, 200B, a tank 202, and a valve 204. The heat trace system includes a first heat trace 206A for heating the first pipe 200A, a second heat trace 206B for heating the second pipe 200B, and a third heat trace 206C for heating the tank 202. Each of the heat traces 206A-C is connected to and receives electrical power from the power supply 20 of the main control system 16

The illustrated wireless components in FIG. 9 include temperature sensors 24A, 24B, a flow meter 210, a vibration sensor 212, a pH monitor 214, a tank level sensor 216, a valve position sensor 218, a valve actuator 220, and a wireless repeater 222. Each of these wireless modules 24A-B, 210, 212, 214, 216, 218, 220, 222 may be powered by their associated heat trace element 206A-C according as described above. For example, each of these wireless modules 24A-B, 210, 212, 214, 216, 218, 220, 222 may include an energy storage device (such as energy storage device 100 in FIG. 8) that stores energy from the voltage difference across the buss wires of their associated heat trace element and uses that stored energy to power components of the wireless modules (as shown in the example of FIG. 8), such as the sensor or actuators thereof, as the case may be. That way, separate power cables do not need to be run to each of the wireless modules.

Further, each of the wireless modules 24A-B, 210, 212, 214, 216, 218, 220, and 222 is in wireless communication with the main control system 16 via a wireless communication network. The wireless communication network could be a self-organizing, self-healing wireless mesh network, as described above.

Also, as described above in connection with the example wireless temperature sensor modules, each of the wireless modules 24A-B, 210, 212, 214, 216, 218, 220, and 222 could transmit wirelessly to the main control system 16 the charge level of their respective energy storage device 100 (or other data indicative of the charge level of the energy storage device). The processor(s) 6 of the main control system 16 (see FIG. 1) can compare the received charged levels from the various wireless modules to determine whether they are sufficiently charged. If not, the main control system 16 can increase momentarily the voltage on the appropriate heat trace element(s) 206A-C so that the energy storage devices of the wireless modules can increase their charge levels. For example, if the charge level of the energy storage device of the flowmeter 210 is low, the main control system 16 can increase the voltage of the heat trace element 206A associated with (i.e., powering) the flowmeter 210 to thereby increase the charge level of the energy storage device of the flowmeter 210. The charge current limiters 110 (see FIG. 8) of the other wireless modules connected to heat tracer element 206A (e.g., the vibration sensor 212, the valve position sensor 218, and the valve actuator 220) can limit the energy storage devices of those wireless components from storing additional charge if they do not need it.

The sensors may wirelessly transmit their sensed conditions (temperature, flow, fluid level, pH level, etc. as the case may be) to the main control system 16. The main control system 16 may control various control devices of the piping system based thereon. In that connection, for remote control devices such as the valve actuator 220, the main control system 16 may wirelessly transmit control commands to the valve actuator 220 as to how to control the valve 204 (open or close it, for example). The valve actuator 220 may wirelessly transmit conformation of the control command back to the main control system via the wireless communication network.

The temperature sensors 24A, 24B sense the temperature of their respective pipe section of the heating system and may be as described above in connection with FIGS. 6-8. The flow measurement sensor (or flowmeter) 210 measures bulk fluid movement in its associated pipe section 200A. The flowmeter 210 may comprise a differential pressure flowmeter, a magnetic flowmeter, a vortex flowmeter, or any other suitable type of flowmeter. It may periodically transmit wirelessly the measured fluid flow for its pipe section 200A to the main control system 16 via the wireless network. The vibration sensor 212 senses vibration of its associated pipe section 200A. The vibration sensor 212 may comprise, for example, one or more accelerometers for detecting movement due to vibrations in one or more directions (or degrees of freedom). It may periodically transmit wirelessly the measured vibration levels for its pipe section 200A to the main control system 16 via the wireless network. The pH monitor 214 can sense the pH level of the fluid in the tank 202 and periodically transmit wirelessly the measured pH levels to the main control system 16 via the wireless network. The level sensor 216 can sense the level of the fluid in the tank 202 and periodically transmit wirelessly the measured fluid levels to the main control system 16 via the wireless network. The level sensor 216 can comprise, for example, a tank fluid measurement device and/or a level switch. Tank level measurement devices can use non-contact level measuring technologies such as radar to detect the level of the fluid in the tank 294. Tank level switches are triggered when the fluid in the tank 204 reaches a pre-established level. The pH monitor 214 and the level sensor 216 can be connected to and powered by the heat trace element 206C used for heating the tank 204. The valve position sensor 218 can detect the position of the valve 204 and periodically transmit wirelessly the valve position status to the main control system 16 via the wireless network. The valve actuator 220 can actuate the valve 204 (open or close it, for example) based on control commands received wirelessly from the main control system 16 via the wireless network. The valve position sensor 218 and valve actuator 220 can be connected to and powered by any appropriate heat trace element, such as heat trace element 206A in FIG. 9.

The wireless repeater 222 may rebroadcast wireless signals to and from the main control system 16 to thereby extend the wireless communication range of the main control system 16. It too may be connected to and powered by one of the power trace elements 206B in the manner described above.

The heat trace system may include additional sensors that are powered by a heat trace element and in wireless communication with the main control system 16 in the manners described herein. For example, the heat trace system may include open/closed contact sensors that sense whether various doors or windows in the system are opened or closed.

The various wireless modules 24A-B, 210, 212, 214, 216, 218, 220, 222 could all comprise components similar to that shown in FIG. 8, except that the RTD 44 in FIG. 8 will be replaced with the appropriate sensor type or control device of the wireless module.

In various embodiments, therefore, the present invention is directed to a heat trace system 10 for heating vessels 12 of a piping system. The invention heat trace system comprises a main control system 16 comprising an electrical power source 20; a plurality of heat trace elements; and a plurality of wireless modules distributed throughout the piping system. Each of the heat trace elements is adjacent to at least one of the vessels of the piping system (see FIGS. 1 and 9), and each is connected to the electrical power source 20 of the main control system 16 (see FIG. 1). Each of the wireless modules: (a) is connected to and powered by an associated heat trace element of the plurality of heat trace elements (see FIGS. 6 and 8); (b) comprises an energy storage device 100 connected to the associated heat trace element for storing energy from the associated heat trace element to power the wireless module (see FIG. 8); and (c) comprises an RF module 52 for communicating wirelessly with the main control system 16 via a wireless communication network (see FIGS. 6 and 8). As such, the stored energy in the energy storage device 100 can be used to power components of the wireless module, even when no current is flowing in the heat trace element to which the wireless module is connected.

In various implementations, the power source 20 of the main control system 16 comprises a plurality of voltage regulators 22 and each of the heat trace elements is connected to one of the voltage regulators 22 (see FIG. 1). In addition, the RF module 52 of each wireless module may wirelessly transmit a charge level of the energy storage device 100 of the wireless module to the main control system 16. The main control system in turn may comprise a programmable controller 18 that is programmed to compare the charge levels of the energy storage devices of the wireless modules to desired charge levels and, based on the comparison, control an output voltage for one or more of the voltage regulators to thereby change the voltage across one or more of the heat trace elements. That way, for example, when a particular wireless module has a energy storage device with a low charge level (below a threshold), upon receiving the report of the low charge level, the main control system 16 can momentarily increase the power to the heat trace element to which the particular wireless module is connected, to thereby increase the energy storage level of the energy storage device of that particular wireless module.

The wireless modules may comprise wireless sensors or control devices of the heat trace system. In the case of wireless sensors, the wireless module comprises a sensor for sensing a condition of an associated vessel of the piping system. Examples of possible wireless sensors for which the present invention could be used include a temperature sensor, a flow measurement sensor, a tank level sensor, a valve position sensor, a pressure sensor, and a vibration sensor. At least some of the embodiments described herein may be implemented in many different embodiments of software, firmware, and/or hardware. The software and firmware code may be executed by a processor circuit or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components.

Moreover, the processes associated with the present embodiments may be executed by programmable equipment, such as computers or computer systems. Software that may cause programmable equipment to execute processes may be stored in any storage device, such as, for example, a computer system (nonvolatile) memory, RAM, ROM, Flash Memory, etc.

In various embodiments disclosed herein, a single component may be replaced by multiple components and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. For example, certain steps shown in FIG. 7 could be performed in different order than shown. The disclosed embodiments are therefore intended to include all such modifications, alterations, and adaptations without departing from the scope of the embodiments as set forth herein.

What is claimed is:

1. A system comprising:
   a piping system comprising a plurality of vessels;
   a main control system comprising an AC electrical power source;
   a plurality of heat trace elements, wherein each of the plurality of heat trace elements is adjacent to at least one of the plurality of vessels of the piping system, and wherein each of the plurality of heat trace elements is connected to the AC electrical power source of the main control system to conduct AC current from the AC electrical power source; and
   a plurality of wireless modules distributed throughout the piping system, wherein each wireless module:
      is connected to and powered by an associated heat trace element of the plurality of heat trace elements;
      comprises an AC-to-DC converter that converts AC voltage from the associated heat trace element to DC voltage;
      comprises a switch connected to the AC-to-DC converter;
      comprises a first controller for controlling the switch;
      comprises a supercapacitor connected to the AC-to-DC converter via the switch, wherein the supercapacitor is for storing energy from the associated heat trace element coupled to the supercapacitor by the AC-to-DC converter and the switch, wherein the energy stored by the supercapacitor from the associated heat trace element is for powering the wireless module, and wherein the first controller controls the switch based on a voltage across the supercapacitor; and
      comprises an RF module for communicating wirelessly with the main control system via a wireless communication network.

2. The system of claim 1, wherein:
   the AC electrical power source of the main control system comprises a plurality of voltage regulators; and
   each of the plurality of heat trace elements is connected to one of the voltage regulators.

3. The system of claim 2, wherein the RF module of each wireless module wirelessly transmits charge level data indicative of the charge level of the supercapacitor of the wireless module to the main control system.

4. The system of claim 3, wherein the main control system comprises a second programmable controller that is programmed to:
   compare the charge levels of the supercapacitors of the wireless modules to desired charge levels based on the charge level data received from the wireless module; and
   control an output voltage for one or more of the voltage regulators based on the comparison to thereby change the voltage across one or more of the heat trace elements.

5. The system of claim 4, wherein the RF modules periodically transmit the charge level data of the supercapacitor of their respective wireless module to the main control system.

6. The system of claim 1, wherein at least one of the wireless modules comprises a sensor for sensing a condition of one of the plurality of vessels of the piping system.

7. The system of claim 6, wherein the sensor is a sensor selected from a group consisting of a temperature sensor, a flow measurement sensor, a tank level sensor, a valve position sensor, a pressure sensor, a vibration sensor, an open/closed contact sensor, a pH monitor, and a density monitor.

8. A heat trace system for heating vessels in a piping system, the heat trace system comprising:
   a main control system comprising an AC electrical power source;
   a plurality of heat trace elements, wherein each of the plurality of heat trace elements is adjacent to at least one of the vessels of the piping system, and wherein each of the plurality of heat trace elements is connected to the AC electrical power source of the main control system to conduct AC current from the electrical power source; and
   a plurality of wireless modules distributed throughout the piping system, wherein each wireless module:
      is connected to and powered by an associated heat trace element of the plurality of heat trace elements;
      comprises an AC-to-DC converter that converts AC voltage from the associated heat trace element to DC voltage;
      comprises a switch connected to the AC-to-DC converter;
      comprises a first controller for controlling the switch;
      comprises a supercapacitor connected to the AC-to-DC converter via the switch, wherein the supercapacitor is for storing energy from the associated heat trace element coupled to the supercapacitor by the AC-to-DC converter and the switch, wherein the energy stored by the supercapacitor from the associated heat trace element is for powering the wireless module, and wherein the first controller controls the switch based on a voltage across the supercapacitor; and
      comprises an RF module for communicating wirelessly with the main control system via a wireless communication network.

9. The heat trace system of claim 8, wherein:
   the AC electrical power source of the main control system comprises a plurality of voltage regulators; and
   each of the plurality of heat trace elements is connected to one of the voltage regulators.

10. The heat trace system of claim 9, wherein the RF module of each wireless module wirelessly transmits charge level data indicative of the charge level of the supercapacitor of the wireless module to the main control system.

11. The heat trace system of claim 10, wherein the main control system comprises a second programmable controller that is programmed to:
    compare the charge levels of the supercapacitors of the wireless modules to desired charge levels based on the charge level data received from the wireless modules; and
    control an output voltage for one or more of the voltage regulators based on the comparison to thereby change the voltage across one or more of the heat trace elements.

12. A method for heating vessels of a piping system by a heat trace system, wherein the heat trace system comprises:
    a main control system comprising an AC electrical power source;
    a plurality of heat trace elements that are each adjacent to a vessel of the piping system, and wherein the plurality of heat trace elements are connected to the AC electrical power source of the main control system to conduct AC current from the AC electrical power source; and a plurality of wireless modules distributed throughout the piping system, wherein each of the plurality of wireless modules:
is connected to and powered by an associated heat trace element of the plurality of heat trace elements,
comprises an AC-to-DC converter that converts AC voltage from the associated heat trace element to DC voltage;
comprises a switch connected to the AC-to-DC converter;
comprises a controller for controlling the switch;
comprises a supercapacitor connected to the AC-to-DC converter via the switch, wherein the supercapacitor is for storing energy from the associated heat trace element that is coupled to the supercapacitor by the AC-to-DC converter and the switch, and wherein the controller controls the switch based on a voltage across the supercapacitor;
the method comprising:
storing energy, by each wireless module, in the supercapacitor of the wireless module, from a voltage difference across the wireless module's associated heat trace element;
powering each wireless module with the stored energy from the supercapacitor of the wireless module; and
communicating, by each wireless module with the main control system, wirelessly via a wireless communication network.

13. The method of claim 12, wherein:
the AC electrical power source of the main control system comprises a plurality of voltage regulators; and
each of the plurality of heat trace elements is connected to one of the voltage regulators.

14. The method of claim 13, further comprising wirelessly transmitting, by each wireless module, charge level data indicative of the charge level of the supercapacitor of the wireless module to the main control system.

15. The method of claim 14, further comprising:
comparing, by the main control system, the charge levels of the supercapacitors of the wireless modules to desired charge levels based on the charge level data received from the wireless modules; and
controlling, by the main control system, an output voltage for one or more of the voltage regulators based on the comparison to thereby change the voltage across one or more of the plurality of heat trace elements.

16. A system comprising:
a piping system comprising a plurality of vessels;
a main control system comprising a programmable controller and an electrical power source, wherein the electrical power source comprises a plurality of voltage regulators;
a plurality of heat trace elements, wherein each of the plurality of heat trace elements is adjacent to at least one of the plurality of vessels of the piping system, and wherein each of the plurality of heat trace elements is connected to one of the voltage regulators; and
a plurality of wireless modules distributed throughout the piping system, wherein each wireless module:
is connected to and powered by an associated heat trace element of the plurality of heat trace elements;
comprises an energy storage device connected to the associated heat trace element for storing energy from the associated heat trace element, wherein the energy stored by the supercapacitor from the associated heat trace element is for powering the wireless module; and
comprises an RF module for communicating wirelessly with the main control system via a wireless communication network, wherein the RF module of each wireless module wirelessly transmits charge level data indicative of the charge level of the energy storage device of the wireless module to the main control system; and
wherein the programmable controller of the main control system is programmed to:
compare the charge levels of the energy storage devices of the wireless modules to desired charge levels based on the charge level data received from the wireless module; and
control an output voltage for one or more of the voltage regulators based on the comparison to thereby change the voltage across one or more of the heat trace elements.

17. A heat trace system for heating vessels in a piping system, the heat trace system comprising
a main control system comprising a programmable controller and an electrical power source, wherein the electrical power source comprises a plurality of voltage regulators;
a plurality of heat trace elements, wherein each of the plurality of heat trace elements is adjacent to at least one of the vessels of the piping system, and wherein each of the plurality of heat trace elements is connected to one of the plurality of voltage regulators; and
a plurality of wireless modules distributed throughout the piping system, wherein each wireless module:
is connected to and powered by an associated heat trace element of the plurality of heat trace elements;
comprises an energy storage device connected to the associated heat trace element for storing energy from the associated heat trace element, wherein the energy stored by the energy storage device from the associated heat trace element is for powering the wireless module; and
comprises an RF module for communicating wirelessly with the main control system via a wireless communication network, wherein the RF module of each wireless module wirelessly transmits charge level data indicative of the charge level of the energy storage device of the wireless module to the main control system; and
wherein the programmable controller of the main control system is programmed to:
compare the charge levels of the energy storage devices of the wireless modules to desired charge levels based on the charge level data received from the wireless modules; and
control an output voltage for one or more of the voltage regulators based on the comparison to thereby change the voltage across one or more of the heat trace elements.

18. A method for a heat trace system that heats vessels of a piping system, wherein the heat trace system comprises:
a main control system comprising an electrical power source that comprises a plurality of voltage regulators;
a plurality of heat trace elements that are each adjacent to a vessel of the piping system, and wherein the plurality of heat trace elements are connected to the one of the plurality of voltage regulators; and
a plurality of wireless modules distributed throughout the piping system, wherein each of the plurality of wireless modules is connected to and powered by an associated one of the plurality of heat trace elements, the method comprising:
- storing energy, by each wireless module, in a energy storage device of the wireless module, from a voltage difference across the wireless module's associated heat trace element;
- powering each wireless module with the stored energy from the energy storage device of the wireless module;
- wirelessly transmitting, by each wireless module, charge level data indicative of the charge level of the energy storage device of the wireless module to the main control system via a wireless communication network;
- comparing, by the main control system, the charge levels of the energy storage devices of the wireless modules to desired charge levels based on the charge level data received from the wireless modules; and
- controlling, by the main control system, an output voltage for one or more of the voltage regulators based on the comparison to thereby change the voltage across one or more of the heat trace elements.

\* \* \* \* \*